(12) United States Patent
Burkay (10) Patent No.: US 7,135,058 B1
(45) Date of Patent: Nov. 14, 2006

(54) POLLUTED AIR TREATMENT METHOD AND SYSTEM

(76) Inventor: Kemal Burkay, 2567 Tree Ridge La., Orlando, FL (US) 32817

(*) Notice: Subject to any disclaimer, the term of this patent is extended or adjusted under 35 U.S.C. 154(b) by 0 days.

(21) Appl. No.: 11/200,365

(22) Filed: Aug. 9, 2005

(51) Int. Cl.
- B01D 47/04 (2006.01)
- B01D 47/06 (2006.01)
- B01D 47/14 (2006.01)

(52) U.S. Cl. .......................... 95/150; 95/197; 95/205; 95/213; 95/216; 95/220; 95/221; 95/225; 95/228; 95/230; 96/265; 96/296; 96/297; 96/298; 261/118

(58) Field of Classification Search .......... 95/150, 95/187, 195, 197, 205, 213, 216, 220, 221, 95/223, 224, 225, 228, 230; 96/265, 274, 96/296, 297, 298; 261/118
See application file for complete search history.

(56) References Cited

U.S. PATENT DOCUMENTS

| | | | |
|---|---|---|---|
| 2,585,440 A | 2/1952 | Collins | |
| 3,613,564 A | 10/1971 | Adamski et al. | |
| 3,690,039 A | 9/1972 | Salemink | |
| 3,733,787 A | 5/1973 | Winningham | |
| 3,811,247 A * | 5/1974 | Huppke | 96/177 |
| 3,918,940 A | 11/1975 | Westlake et al. | |
| 4,067,706 A | 1/1978 | Georgopapadakos | |
| 4,116,843 A | 9/1978 | Koenig | |
| 4,165,973 A | 8/1979 | Stergiou | |
| 4,694,906 A * | 9/1987 | Hutchins et al. | 166/294 |
| 4,938,787 A | 7/1990 | Simmerlein-Erlbacher | |
| 4,943,306 A * | 7/1990 | Cho | 96/237 |
| 5,246,471 A | 9/1993 | Bhat | |
| 5,803,955 A * | 9/1998 | Raring | 96/239 |
| 5,826,518 A | 10/1998 | Bhat | |
| 5,935,525 A | 8/1999 | Lincoln | |
| 6,007,055 A | 12/1999 | Schifftner | |
| 6,267,804 B1 | 7/2001 | Marlowe | |
| 6,478,859 B1 | 11/2002 | Ferlin et al. | |
| 6,641,635 B1 | 11/2003 | Chiesl | |
| 6,843,835 B1 | 1/2005 | Fornai et al. | |

FOREIGN PATENT DOCUMENTS

WO   WO 2004/099678 A3   11/2004

* cited by examiner

Primary Examiner—Robert A. Hopkins
(74) Attorney, Agent, or Firm—Terry M. Sanks, Esq.; Beusse Wolter Sanks Mora & Maire, P.A.

(57) ABSTRACT

A system for removing at least one pollutant from an air stream exhaust, the system including a plurality of enclosures through which the air stream exhaust is directed to cool the air stream exhaust, a plurality of barriers within each respective enclosure to impede a flow of the air stream exhaust, a liquefied material, comprising bone glue, gelatin and/or skin glue, mixed with water provided within at least one of the plurality of enclosures, and wherein the air stream exhaust passes therethrough the liquefied material and at least one pollutant attaches to the liquefied material.

20 Claims, 4 Drawing Sheets

| Material | Percent Material | Percent Water |
|---|---|---|
| Bone Glue | 3% to 20% | 97% to 80% |
| Gelatin | 3% to 15% | 97% to 85% |
| Skin Glue | 5% to 20% | 95% to 80% |
| Combination of any of the above | 2% to 20% | 98% to 80% |
| Dextrin | Maximum amount combined with any combination of any of the above-5% | 100% to 95% |

POLLUTED AIR TREATMENT METHOD AND SYSTEM

FIELD OF THE INVENTION

This invention relates generally to the field of environmental pollution control and, more particularly, to a system and method for effectively eliminating all impurities from an exhaust air stream prior to the air being released into the atmosphere.

BACKGROUND OF THE INVENTION

Numerous industries produce exhaust air containing harmful particulates to the atmosphere and living beings. Such industries include, but are not limited to, automotive, wood products, laundry dryers, furniture manufacturers, copper manufacturers, aluminum producers, cement manufactures, foundries, plastics producers, PVC producers, chemical material producers, stationary diesel and turbine generators, power plants, tanning, inks and printing, paper products, paper mills, transatlantic vessels, trains, organic waste fired hospitals, refineries, rubber producers, transatlantic vessels, locomotives, medical plants, incineration plants, kitchen chimneys, odor creating industries, other industrial plants, etc. Such harmful particulates include, but are not limited to volatile organic compounds (V.O.C.s), nitrous oxide compounds (NOx), sulphur (SOx), mercury, phosphor, and carbon oxide compounds (CO). Additionally, when coal is burned, in some countries, radiation particulates are found to be a waste product.

Legislative efforts have established emission standards to control emission wherein these standards identify how much of a certain particulate may enter the atmosphere from an exhaust air stream. Current and future compliance with such standards places a continuing demand on industry and creates an ongoing need to reduce, degrade, and eventually destroy pollutants in exhaust air stream in a cost effective manner.

Many methods and systems are currently utilized to reduce particulates from entering the atmosphere. Such methods and systems include, but are not limited to, scrubbers, incineration techniques, exposure to ultraviolet light, mechanical filtering, electrostatic filtering, condensing heat exchangers, and etc. Even though many approaches are currently utilized to reduce harmful particulates, a certain amount of these harmful particulates still are released into the atmosphere.

BRIEF DESCRIPTION OF THE INVENTION

The present invention is directed towards a system and method for effectively eliminating all impurities from an exhaust air stream prior to the air being released into the atmosphere wherein no removable filters are utilized and the complete system can be automated. Such a system and method provides a low cost approach towards eliminating unwanted and harmful effects from industries that must release by-products through an exhaust system.

Towards this end a system for removing at least one pollutant from an air stream exhaust is disclosed. The system comprises a first enclosure, usually positioned horizontally, with a first end through which the air stream exhaust enters and a second end through which the air stream exhaust exits. With the first enclosure exists a first barrier impeding a course of the air stream exhaust. A cooling device is proximate the first enclosure to cool the air stream exhaust.

Proximate the second end of the first enclosure is a second enclosure, generally having an elongated shape positioned horizontally, with a first end proximate the second end of the first enclosure and a second end through which the air stream exhaust exits the second enclosure. Within the second enclosure is a second barrier impeding a path of the air stream exhaust. Also within the second barrier is a plurality of openings to allow the air stream exhaust to pass through and/or around the second barrier.

A third enclosure, having an elongated shape positioned vertically, is also provided. It has a first end proximate the second end of the second enclosure and a second end through which the air stream exhaust exits the third enclosure. A third barrier is fixed within the third enclosure that impedes a path of the air stream exhaust. A plurality of openings to exist with the third enclosure to allow the air stream exhaust to pass through and/or around the third barrier.

A liquefied material is fed into the second enclosure and/or the third enclosure. The liquefied material comprises water mixed with bone glue, gelatin, and/or skin glue. Thus, as the air stream exhaust passes through the liquefied material, the pollutant attaches to the liquefied material.

A method of treating an air stream containing at least one pollutant is disclosed. The method comprises reducing a temperature of the air stream by directing the air stream through a first enclosure having cooling devices located proximate the air stream. The method further includes reducing a velocity of the air stream by directing the air stream through the first enclosure, a second enclosure, and a third enclosure wherein each enclosure has a barrier impeding and redirecting a path of the air stream. The method also includes injecting a liquefied material within the second enclosure and/or the third enclosure proximate the barrier so that the air stream passes therethrough the liquefied material wherein the liquefied material comprises bone glue, gelatin, and/or skin glue, mixed with water.

A system for removing at least one pollutant from an air stream exhaust is disclosed. The system comprises a plurality of enclosures through which the air stream exhaust is directed to cool the air stream exhaust, a plurality of barriers within each respective enclosure to impede a flow of the air stream exhaust, and a liquefied material, comprising at least one of bone glue, gelatin or skin glue, mixed with water provided with at least one of the plurality of enclosures. The air stream exhaust passes therethrough the liquefied material and at least one pollutant attaches to the liquefied material.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Though various emission control systems and methods exist today, none are effectively eliminating nearly all unwanted and harmful contaminants while also resulting in a cost-effective system and method. The present invention is such a system and method that may be used in a plurality of industries where unwanted particulates and contaminants exist in an air stream exhaust.

Figure 1:
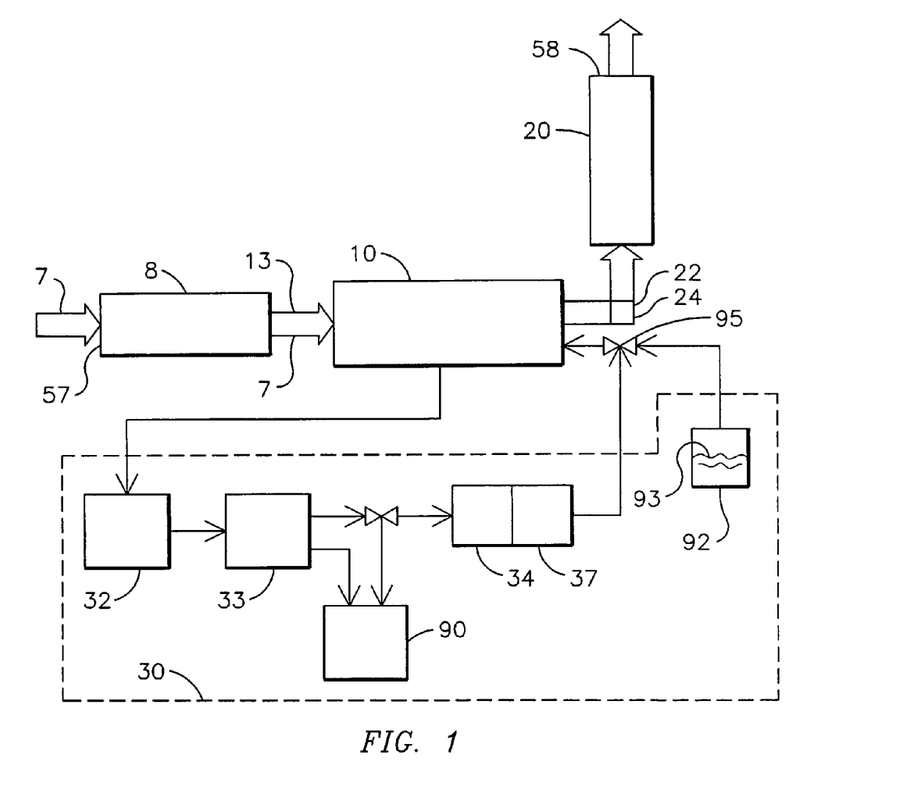
FIG. 1 is an illustration of an exemplary embodiment of blocks representing elements that comprise the present invention.
Figure 2:
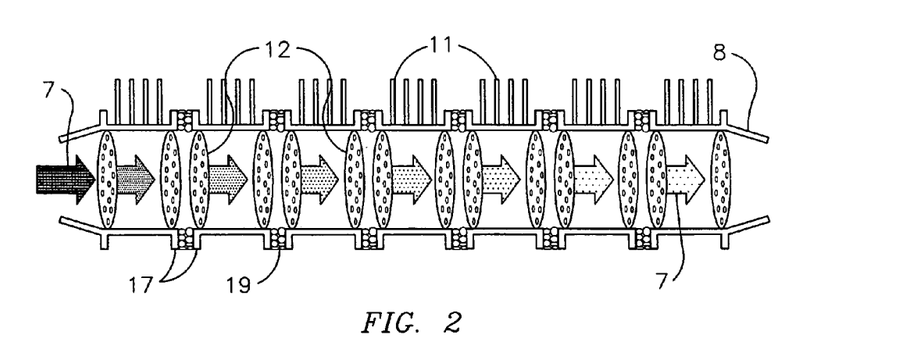
FIG. 2 is an illustration of an exemplary embodiment of a heat reducer unit.

FIG. 1 is an illustration of an exemplary of blocks representing elements that comprise the present invention. Exhaust smoke 7 flows into a heat reducer unit 8. Within the heat reducer unit, as further illustrated in FIG. 2, are a plurality of perforated plates with heat exchange units attached to each perforated plate. Upon exiting the heat reducer unit 8, the smoke 7 is fed into a horizontal toxic capture unit 10. The horizontal unit 10 and heat reducer unit 8 can be directly connected or depending on the placement of these units be connected by an intermediate connector 13.

Figure 3:
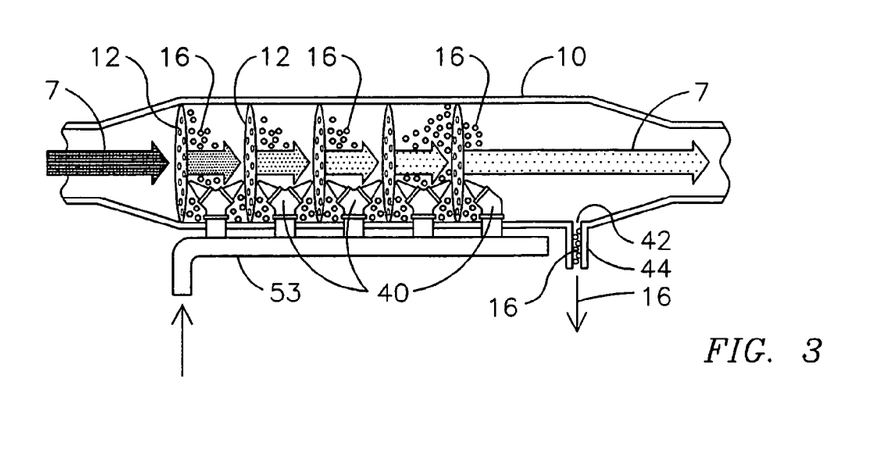
FIG. 3 is an illustration of an exemplary embodiment of a horizontal toxic capture unit of the present invention.

Within the horizontal unit 10, as further illustrated in FIG. 3, a plurality of perforated plates 12 are installed. In a preferred embodiment heat exchange units 14 are attached to the perforated plates 12. A liquefied material, or foam-like substance, or material 16, is injected into the horizontal unit 10. In another preferred embodiment, the substance 16 is injected as a liquid 16 but because of its interaction with the perforated plates 12, it quickly turns into foam-like substance 16. The foam-like substance, or material, 16 is continuously sprayed into the horizontal unit 10. Because of the chemical composition of the foam-like material 16, the material 16 has an adhesive component wherein it captures pollutants when the smoke interacts with the material 16.

The horizontal unit 10 is connected to a vertical toxic capture unit 20. As with the connection between then heat reducer unit 8 and the horizontal unit 10, the horizontal unit 10 and vertical unit 20 may be either directly connected on may have an intermediate connector, such as an elbow connector 22, between the two units. The exhaust smoke 7 flows from the horizontal unit 10 into the vertical unit 20. When an elbow unit 22 is provided, a cooling unit 24 is connected to the elbow unit 22 to further reduce the temperature of the exhaust 7. Similarly, a cooling unit 24 can be used in the elbow connector between the heat reducer unit 8 and the horizontal unit 10.

Figure 4:
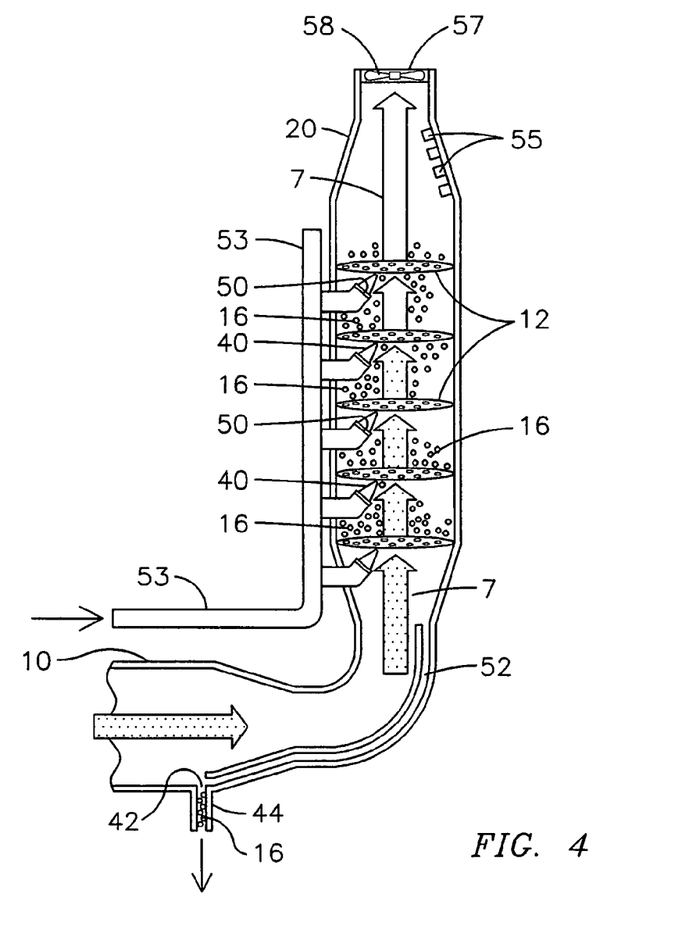
FIG. 4 is an illustration of an exemplary embodiment of a vertical toxic capture unit of the present invention.

Like the horizontal unit 10, perforated plates 12 are placed within the vertical unit 20, as further illustrated in FIG. 4. In a preferred embodiment, the foam-like substance 16 is fed into the vertical unit 20. In another preferred embodiment, depending on the types of pollutants to be removed and/or the level of pollutants to be removed, the foam substance 16 may only be fed into the horizontal unit 10. In both the vertical unit 20 and/or the horizontal unit 10, passages 42, 44 are provided for the residual foam 16 to gather and then flow into a recycling system 30. The recycling system 30 comprises a plurality of conveyor systems 32, 33 wherein the foam-like material 16, now reduced to a liquid after interacting with the smoke 7, is cleaned further as it passes through each conveyor system 32, 33. Once cleaned, it is placed within a final tank, or storage area, 34 for final preparation prior to being re-introduced within the horizontal unit 10 and/or the vertical unit 20. In a preferred embodiment when provided to the units 10, 20 as a foam-like material 16, the cleaned liquid 16 passes through a processor unit 37 within the final tank area 34 which excites the liquid 16 causing it to foam.

The waste by-product that is left after the material 16 is cleaned is transferred to a disposal tank 90, or a remote location such as a sediment pond. Also, as discussed below, a tank 92 is provided for a cleaning substance 93 wherein a valve 95 is provided to allow the cleaning substance 93 to flow through the horizontal unit 10, vertical unit 20 and recycling system 30.

Figure 8:
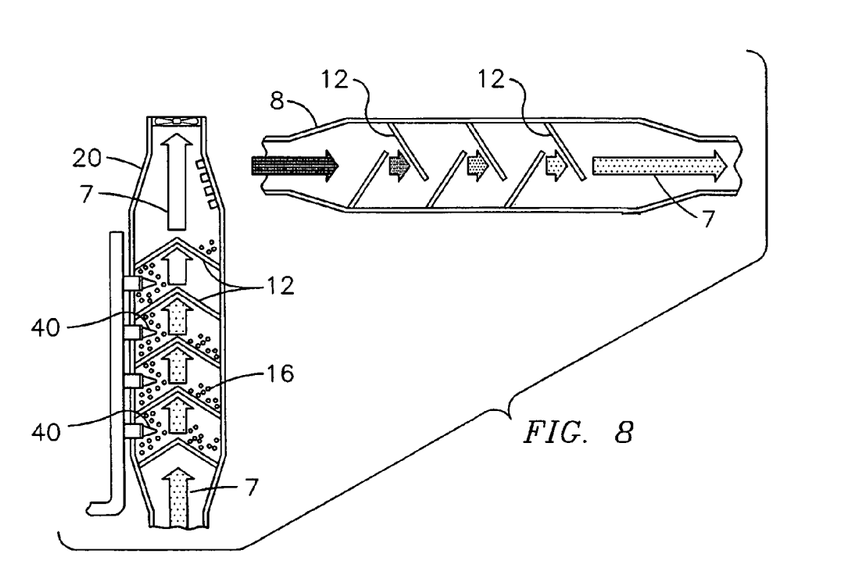
FIG. 8 is an illustration of exemplary embodiments of other configurations for barriers.

FIG. 2 is an illustration of an exemplary embodiment of a heat reducer unit. As illustrated, the heat reducer unit 8 has a plurality of perforated plates 12 fixed within the unit 8, along the length of the unit 8 where the plates extend across the cross section of the inner surface of the heat reducer unit 8. Part of the purpose of the plates 12 is to slow the air exhaust down so that the cooling aspects of the heat reducer unit can perform its tasks. Towards this end, though the plate 12 are illustrated as extending across the inner surface of the heat reducer unit 8, those skilled in the art will readily recognize that other barriers can be utilized to achieve the same effect. For example, as illustrated in FIG. 8, barriers 12 are positioned angled within the unit 8 so that the air stream 7 in essence must flow around the various barriers as oppose to flowing in a straight, or direct, path. Though discussed here related to the heat reducer unit 8, a similar approach can also be used for the plates 12 discussed below with respect to the horizontal unit 10 and the vertical unit 20.

External cooler plates 11 are located proximate the outer surface of the heat reducer unit 8. The external cooler plates 11 have heat exchangers 62 attached to them, similar as the perforated plates 12 discussed below. In a preferred embodiment, the heat reducer unit 8 has a plurality of segments connected together at flanges 17. A high quality isolation material 19 is fixed between two adjacent flanges. The isolation material is made of a material to prevent leakage of gas and/or liquid. It also operates as a heat absorption heat resistance barrier to prevent the travel of heat energy to the rest of the components of the present invention. Though the heat reducer unit is shown having a plurality of segments, the heat reducer can also be constructed as a single element where the flange exists only between the elbow leading to the horizontal unit 10 or between the heat reducer unit 8 and the horizontal unit 10 when no intermediate connector is provided.

FIG. 3 is an illustration of an exemplary embodiment of a horizontal toxic capture unit 10 of the present invention. As illustrated, perforated plates 12 are fixed across the diameter of the unit 10. In a preferred embodiment, a plurality of openings 40 is provided for the foam-like material 16 to enter the horizontal unit 10. In another preferred embodiment, the openings 40 are nozzles. In one exemplary embodiment, when nozzles are used, the foam-like material is injected as liquid wherein the material's interaction with the plates 12 and atmosphere within the horizontal unit 10 in general causes the liquid substance 16 to transform to the foam-like substance 16. The foam-like material 16 captures toxins within the exhaust 7 as small as at the macroscopic level and after doing so, turns to a more liquid state and drops downward to the bottom of the inside of the horizontal unit 10. As further illustrated, a return opening 42 and line 44 are provided for used foam-like material 16 to collect and flow into the recycling conveyor system 32, 33.

Though this unit is described as horizontal, those skilled in the art will readily recognize benefits if the unit is positioned nearly horizontal. Thus even though this unit 10 is described as the horizontal unit, the unit can be angled where it is not completely horizontal. An exemplary example of when the unit 10 may be angled is to angle the unit so that material 16 ready to be recycled will flow downward towards the opening 42 and channel 44 receiving the material 16 to be recycled.

FIG. 4 is an illustration of an exemplary embodiment of a vertical toxic capture unit 20 of the present invention. As illustrated, perforated plates 12 are fixed across the diameter of the unit 20. Though the term diameter is being used, those skilled in the art will readily recognize that the dimension of the units 8, 10, 20 can be a plurality of shapes wherein the perforated plates 12 will cross-sect the inner walls of the units 8, 10, 20 regardless of its dimension. Thus if the cross section shape of the units 8, 10, 20 are square or rectangular, the perforated plates 12 will be either square or rectangular, respectively.

Openings 40 are provided for the foam material 16 to enter the vertical unit 20. As discussed above with respect to the horizontal unit 10, the openings 40 can be nozzles. Though a plurality of approaches can be used to provide the openings 40, in an exemplary embodiment, a pipe 53 is located along an outside surface of the vertical unit wherein openings in the pipe 53 are in connection with respective openings 50. The pipe 53 is used to feed the liquefied material 16 to the horizontal unit 10 and/or the vertical unit 20. As discussed above, after capturing the pollutants, return openings 52 are provided to collect and allow the foam-like material 16 to return to the recycling conveyor system 32, 33. As illustrated, the opening 52 is connected to the return line 44. As discussed above, the foam-like material 16 is returned after toxins have attached to the foam-like material wherein the foam-like material turns to a liquid-like material. The material 16 settles on the plates and drops through the holes 60 in the plates 12 until it the opening 52 leading to the channel 44 taking the material 16 to the recycling system 30. In a preferred embodiment, the openings 52 can feed into the channel 44 used for the horizontal unit 10. In another preferred embodiment, a second channel 44 is provided for the vertical unit 20. Those skilled in the art will readily recognize that any number of channels 44 can be utilized.

Quality gas sensors 55 are positioned above the perforated plates 12. In another preferred embodiment, gas sensors 55 are located at a plurality of locations in both the horizontal and vertical units 10, 20. The sensors are provided to insure that the exhaust is at an acceptable clean air standard. Above the sensors 55 in the vertical unit 20 an output section 57 is provided. In a preferred embodiment, a fan 58 is part of the output section 57 wherein the fan is orientated to pull the exhaust out of the system. Depending on the size of the present invention based as the use of the present invention, a second fan 61 may also be used at the beginning of the horizontal unit 10 orientated to pull the air from the heat reducer unit 8 into the horizontal unit 10. The number and location of the fans 58 can vary depending on the size of the present invention, the amount of exhaust being cleaned through the present invention and the pollutants to be removed. Thus, even though up to two fans are disclosed with certain orientations, those skilled in the art will readily recognize that the placement of the fans, and number of fans utilized may vary wherein the orientation of the fans will be dictated by the placement of the fans.

Though this unit is described as vertical, those skilled in the art will readily recognize benefits if the unit is positioned nearly vertical. Thus even though this unit 10 is described as the vertical unit, the unit can be angled where it is not completely vertical. An exemplary example of when the unit 10 may be angled is to angle the unit so that material 16 ready to be recycled will flow downward towards a specific location or side towards the opening 42 and channel 44 receiving the material 16 to be recycled.

Figure 5:
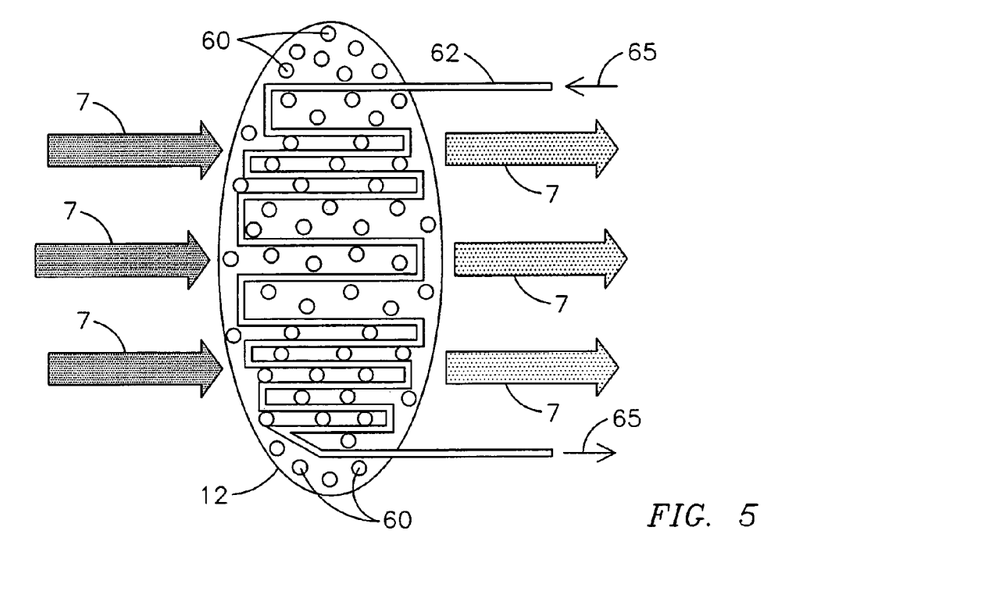
FIG. 5 is an illustration of an exemplary embodiment of a plate that is displaced within the heat reducer unit, vertical toxic capture unit and/or the horizontal toxic capture unit.
Figure 6:
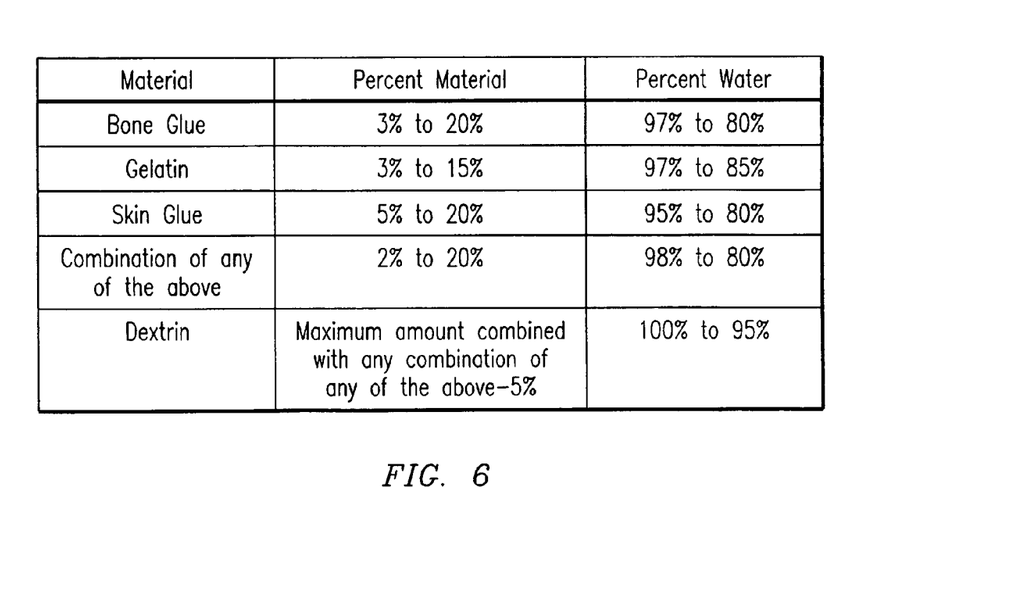
FIG. 6 is a chart illustrating exemplary amounts of materials that may be used for the liquid/foam used in the present invention.
Figure 7:
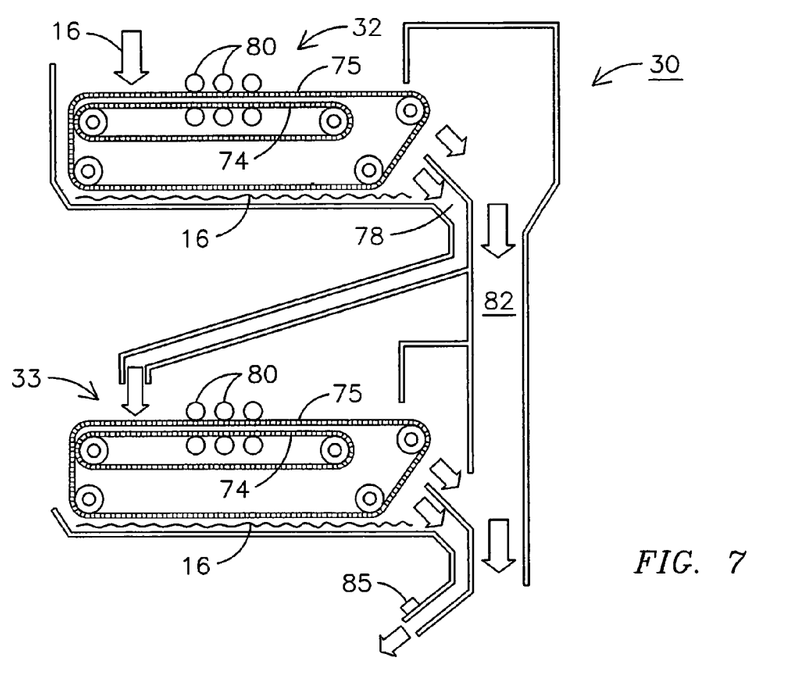
FIG. 7 is an illustration of an exemplary embodiment of a disposal outlet conveyor system.

FIG. 5 is an illustration of an exemplary embodiment of a perforated plate 12 that is fixed within the heat reducer unit 8, vertical toxic capture unit 20 and/or the horizontal toxic capture unit 10. Holes 60 are formed therethrough the plate 12. The holes 60 can be fixed in a pattern or randomly placed. Those skilled in the art will readily recognize the size of the holes may vary. Similarly, though the term holes are used, those skilled in the art will readily recognize that the shape of the holes is infinite. Though circular holes are illustrated, other shapes may be used. When circular holes 60 are used, the holes 60 in the plates 12 are between 1 to 4 millimeters in diameter. The horizontal unit 10 is designed to capture macroscopic toxins and the vertical unit 20 is designed to capture microscopic toxins.

A heat exchanger 62, comprising a system of pipes in an exemplary embodiment, is attached to the perforated plate 12. Though illustrated with the longer sections of the pipes having a horizontal configuration, those skilled in the art will readily recognize that the configuration of the pipes can have an infinite number of shapes. A cooling liquid 65 is supplied through the heat exchanger 62 that in turn keeps the plate 12 at a cooler temperature than the exhaust 7 and/or foam-like material 16 passing through it. Exemplary examples of the liquid include, but is not limited to cold water, Freon, ammonia, heat exchange oil, etc. The heated liquid 65 flows from the heat exchanger 62. In a preferred embodiment, perforated plates 12 are fixed within the heat reducer unit 8, the horizontal unit 10, and/or vertical unit 20. As discussed above, perforated plates 12 in the heat reducer unit 8 will have heat exchangers 62 connected to respective plates 12. Depending on the contaminants being removed from the exhaust 7 and the industry the present invention is being used in, the heat exchangers 62 may not be attached to the plates 12 within the horizontal unit 10 and/or the vertical unit 20.

The plates 12 are shown as being flat, the plates 12 may have a plurality of other shapes. For example, the plates may be coned shaped. Plates 12 in different units 8, 10, 20 may have different shapes as well. For example, flat plates 12 may be utilized in the heat reducer unit 8 and the horizontal unit 10. However to further direct the used material 16 towards the outlets 52, 44, 42 so the material 16 can be recycled, cone shaped plates (or if the unit is circular in nature or pyramidal shaped if the unit is square or rectangular in shape) may be used so as to direct the main flow of the material 16 to be recycled towards the side walls of the unit 20. Also the plates need not extend fully across the cross sectional area of the units 8, 10, 20. The plates 12, or barriers, need only be positioned to prevent the exhaust 7 from taking an unobstructed path through any of the units 8, 10, 20. With respect to the horizontal unit 10 and the vertical unit 20, the path, or paths are of a size to allow the exhaust to engage the liquefied material 16 prior to passing beyond the barrier 12.

In a preferred embodiment, the foam-like material 16 can be an individual element or bone glue, skin glue, and gelatin, or a combination of at least two of bone glue, skin glue and gelatin. In either its foam-like state or liquid-like state the material 16 is a liquefied material since such characteristics are needed to spread the material within the horizontal unit 10 and the vertical unit 20.

Bone glue is water-soluble whether it is natural or synthetic. It is made of animal bones. It can be used in any physical form, such as, but not limited to powder, plate form, solid, pellet, etc. Gelatin is also water-soluble. Gelatin can be food grade or industrial grade and like bone glue, can be used in any physical form. Skin, or hide glue is water-soluble whether it is naturally formed or synthetic. It too can be used in any physical form. Another element that can also be used is dextrin glue. Like the others it too is water-soluble. The source of this material includes, but not limited to, potato, corn, wheat, etc. Unlike the other materials disclosed, dextrin glue does not have naturally foaming ability, thus it can only be used with the other mentioned materials. Using gelatin, bone glue, or skin glue together or separately does not affect the functionality of the present invention. In an exemplary embodiment any element or combination of elements that produce a substance that has foam-like characteristics and that is adhesive in nature to attach to pollutants in an air stream 7.

The material selected is mixed with water having a temperature range of 30 degrees Celsius to 200 degrees Celsius. Either electrical resistance or heat exchanger tubes can heat the container 34 where the mixture is being prepared. The temperature of the mixture determines how the material is used within the present invention. For example, depending on the material mixed, if the temperature of the mixture is over approximately 100 degrees Celsius, the material will foam and can be supplied to the horizontal unit 10 and vertical unit 20 as foam 16. If the temperature of the mixture is below approximately 100 degrees Celsius, the material 16 will be of a liquid state and it is supplied to the horizontal unit 10 and vertical unit 20 through nozzles wherein by feeding the liquid through the nozzles, where the liquid 16 is expended at a high pressure, the liquid enters the units 10, 20 as foam 16. In another preferred embodiment, the tank 34 holding the mixture has a propeller type mixer continually mixing the material together. Those skilled in the art will recognize that other techniques may also be utilized to condition the liquid 16 for insertion within the horizontal unit 10 and/or vertical unit 20.

Exemplary amounts of material to combine with hot water are provided in FIG. 6. Thus, as illustrated, when only bone glue is used in 1000 kilograms (kg) of hot water, 30 kg to 200 kg of bone glue is used. Similarly, 30 kg to 200 kg of gelatin are needed in 1000 kg of hot water and 50 kg to 200 kg of skin glue is used in 1000 kg of hot water. As for dextrin glue, a combination of dextrin and one of the other materials collectively from 50 kg to 150 kg are needed in 1000 kg of hot water. The differential in quantity depends on the quality of the smoke to be cleansed and what kinds of toxins are desired to be removed.

In operation, as the exhaust 7, or smoke, passes first through the heat reducer unit 8, then into the horizontal unit 10 and then the vertical unit 20, the present invention reduces the temperature of the exhaust 7 as well as reduces the velocity of the smoke 7 and its traveling shape as well. Thus, the kinetic energy of the smoke 7 is neutralized as it passes through the heat reducer unit, the horizontal unit 10 and the vertical unit 20. Passing through the heat reducer unit 8, with the heat exchangers attached to the perforated plates inside and heat exchangers attached to plates on the outside of heat reducing unit will significantly lower the temperature of the exhaust. By having the perforated plates 12 across the cross section of the inside of the heat reducer unit 8, the velocity of the exhaust 7 is also slowed. Though a fan, or fans are installed to assist in moving the exhaust through the system (so as to prevent the exhaust 7 from backing up), the perforated plates 12 across the cross section of the inner surface of the horizontal unit 10 and vertical unit 20 further reduce the velocity of the exhaust 7.

The perforated plates 12 can be made of a plurality of materials, such as but not limited to fiberglass and metal. The perforated plates 12 temporarily halt the forward progress of the exhaust 7 until the exhaust 7 can pass through the holes 70 disposed therethrough the perforated plate 12. At this critical time, the foam-like substance 16 has the opportunity to capture toxins from the smoke 7. In a preferred embodiment, the foam-like material 16 is positioned within or near the holes 60. This is done by the nozzles 40 directing the foam-like material 16 towards the face and/or back of the plates 12 wherein both surfaces, including the holes 60 may be covered with the foam-like material 16. Thus, the toxins that make up part of the exhaust 7 attach to the foam-like material 16 and the exhaust 7 then continues through the holes 60 without the toxins, or if there are a high quantity of toxins, without as many toxins, as the number of toxins is continuously removed from the smoke 7 as the exhaust 7 passes through the other plates 12 in both the horizontal unit 10 and the vertical unit 20.

FIG. 7 is an illustration of an exemplary embodiment of a disposal outlet conveyor system 30. Referring back to FIG. 1, once the foam-like material 16 converts to liquid-like substance 16 with pollutants attached, and passes through outlets, or channels, 42, 44, 52 leading to the disposal chambers 32, 33, the liquid-like material 16 is recycled through the disposal outlet conveyor system 32, 33. As illustrated, the liquid-like material 16 falls onto a conveyor 74, such as double flat conveyor belts. In an exemplary embodiment, smaller than macroscopic holes 75 are displaced in the conveyor belt 74 wherein macroscopic particular matter cannot pass through the holes 75; however, the liquid-like material 16, now with the particular matter removed, can pass down to a channel 78 to allow the liquid-like material 16 to pass through a second conveyor system 33, similar to the one disclosed herein. In an exemplary embodiment, the second conveyor can have larger holes. Though only two conveyor systems 32, 33 are disclosed, those skilled in the art will readily recognize that the present invention could have any number of conveyor systems used to further clean the liquid-like material 16.

Cylinders, or rollers, 80 are provided for pressing and squeezing the conveyor belts 74 to assist in separating the particulate matter, toxins, from the liquid-like material 16. In a preferred embodiment the cylinders are rubber. For the separated particulate matter, or toxins, and/or the liquid-like material that did not have particulate matter removed from it, they are passed on to a disposal channel 82 for later disposal of the liquid and/or contaminants. Once the liquid-like material 16 has passed through all disposal outlet conveyor systems 32, 33, it is returned to a container 34 to prepare it for reintroduction into the horizontal unit 10 and/or vertical unit 20.

Thus, as illustrated, in a preferred embodiment no replaceable filters are utilized. If cleaning is required, instead of feeding the material 16 through the system, water or a cleaning substance can be fed through the system wherein instead of the cleaning substance being returned to the holding tank 34, it is returned to a cleaning substance tank.

Sensors 85 contained either in the conveyor system 32, 33, the storage tank 34, the vertical unit 20, or the horizontal unit 10 analyze the quality of the liquid-like substance 16. Within the storage tank 34, a second sensor 87 measures the amount of liquid 16 available since some may be lost during the recycling and due to evaporation of the liquid 16. A feed system 89 is provided to inject, preferably automatically, the requisite materials needed, including water, to keep the quality of the liquid 16 at a constant level. As discussed above, the storage tank includes a processor 37 to prepare and maintain the substance 16 in a state (as discussed above) for re-introduction.

Though only a single heat reducer unit 8, horizontal unit 10, and vertical unit 20 are primarily disclosed above, more than one of any of these units may be used in a configuration of the present invention. Thus as an exemplary example, elbows may be used to connect a plurality of vertical units 10 wherein the exhaust is first directed upward and then downward through a second vertical unit 20, and then upward again through a third vertical unit 20. Though not illustrated, ones skilled in the art will readily recognize this figuration.

Similarly, though the substance 16 is discussed above as being supplied to the present invention within the horizontal unit 10 and the vertical unit 20, depending on the pollutant being removed, the substance may be applied to only one of these units. Likewise, though plates are discussed as the barriers, other structures may be used. For example, the horizontal unit 10 and/or the vertical unit 20 may be packed with materials such as ceramics, seashells, glass, metal balls or pebbles in any shape, size or form. These units 10, 20 will be packed in a manner to achieve desired airflow where the liquefied material 16 is still sprayed into the units 10, 20 so that the air stream exhaust 7 must still pass through the liquefied material 16. When a plurality of various units are used, the types of barriers per unit may vary, similar to which units are supplied the liquefied material 16.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What I claim is:

1. A system for removing at least one pollutant from an air stream exhaust, the system comprising:
   a) a first enclosure, having an elongated shape positioned horizontally, with a first end through which the air stream exhaust enters and a second end through which the air stream exhaust exits;
   b) a first barrier fixed within the first enclosure impeding a course of the air stream exhaust;
   c) a cooling device proximate the first enclosure to cool the air stream exhaust;
   d) a second enclosure, having an elongated shape positioned horizontally, with a first end proximate the second end of the first enclosure and a second end through which the air stream exhaust exits the second enclosure;
   e) a second barrier fixed within the second enclosure impeding a path of the air stream exhaust;
   f) a plurality of openings to allow the air stream exhaust to pass at least one of through and around the second barrier;
   g) a third enclosure, having an elongated shape positioned vertically, with a first end proximate the second end of the second enclosure and a second end through which the air stream exhaust exits the third enclosure;
   h) a third barrier fixed within the third enclosure impeding a path of the air stream exhaust therethrough the third barrier;
   i) a plurality of openings to allow the air stream exhaust to pass at least one of through and around the third barrier;
   j) a liquefied material, fed into at least one of the second enclosure and the third enclosure, comprising at least one of bone glue, gelatin, and skin glue mixed with water; and
   k) wherein the air stream exhaust passes through the liquefied material and at least one pollutant attaches to the liquefied material.

2. The system of claim 1 where the liquefied material comprises at least one of the following amounts of materials mixed with water: approximately three percent to twenty percent bone glue, approximately three percent to fifteen percent gelatin, approximately five percent to twenty percent skin glue, and approximately two percent to twenty percent of any combination of at least two of bone glue, gelatin, and skin glue.

3. The system of claim 1 wherein the liquefied material further comprises at least a maximum of approximately five percent of dextrin combined with the following materials mixed with water: bone glue, gelatin, and skin glue.

4. The system of claim 1 further comprising a system for recycling the liquefied material.

5. The system of claim 4 wherein the system for recycling the liquefied material further comprises a conveyor system with holes formed therethrough a conveyor belt to allow cleaned liquefied material to pass to a container for further use and the pollutant to reach a container for disposal.

6. The system of claim 4 wherein the system for recycling the liquefied material further comprises a plurality of rollers for compressing the conveyor.

7. The system of claim 1 wherein a second heat exchanger is proximate at least one of the second barrier and the third barrier.

8. The system of claim 1 further comprising a cleaning material and cleaning material holding container wherein said cleaning material is feed into at least one of the second enclosure and the third enclosure.

9. The system of claim 8 further comprising a valve to control a flow of at least one of the liquefied material and the cleaning material into at least one of the second enclosure and the third enclosure.

10. The system of claim 1 further comprising a fan attached to at least one of the second enclosure and the third enclosure to direct the air stream exhaust through the system.

11. The system of claim 1 wherein the first enclosure further comprises segments separated by an isolation material operatable to prevent leakage and prevent heat passage beyond the isolation material.

12. The system of claim 1 wherein the liquefied material is fed into at least one of the second enclosure and the third enclosure in at least one of a foam-like state and a liquid-state.

13. A method of treating an air stream containing at least one pollutant, the method comprising:

a) reducing a temperature of the air stream by directing the air stream through a first enclosure having cooling devices located proximate the air stream;
b) reducing a velocity of the air stream by directing the air stream through the first enclosure, a second enclosure and a third enclosure wherein each enclosure has a barrier impeding and redirecting a path of the air stream;
c) injecting a liquefied material within at least one of the second enclosure and the third enclosure proximate the barrier so that the air stream passes therethrough the liquefied material wherein the liquefied material comprises at least one of bone glue, gelatin, and skin glue mixed with water.

14. The method of claim 13 wherein the step of injecting a liquefied material further comprises the liquefied material comprising at least one of the following amounts of materials mixed with water: approximately three percent to twenty percent bone glue, approximately three percent to fifteen percent gelatin, approximately five percent to twenty percent skin glue, and approximately two percent to twenty percent of any at least two of bone glue, gelatin, and skin glue.

15. The method of claim 13 wherein the step of injecting a liquefied material further comprises the liquefied material comprising at least a maximum of approximately five percent of dextrin combined with the following materials mixed with water: bone glue, gelatin, and skin glue.

16. The method of claim 13 further comprising removing the liquefied material from at least one of the second enclosure and the third enclosure and recycling the liquefied material.

17. The method of claim 16 wherein the step of recycling the liquefied material comprises transferring the liquefied material to a conveyor system with a plurality of holes therethrough a conveyor belt to allow the liquefied material to pass to a container for further use and the pollutant to reach a container for disposal.

18. A system for removing at least one pollutant from an air stream exhaust, the system comprising:

a) a plurality of enclosures through which the air stream exhaust is directed to cool the air stream exhaust;

b) a plurality of barriers within each respective enclosure to impede a flow of the air stream exhaust;

c) a liquefied material, comprising at least one of bone glue, gelatin and skin glue, mixed with water provided within at least one of the plurality of enclosures; and d) wherein the air stream exhaust passes therethrough the liquefied material and at least one pollutant attaches to the liquefied material.

19. The system of claim 18 further comprising a recycling unit for preparing the liquefied material for continued use.

20. The system of claim 19 wherein the recycling unit comprises a conveyor system with holes formed therethrough a conveyor belt to allow cleaned liquefied material to return to a container for continued use and the pollutant removed from the liquefied material to reach a container for disposal.

* * * * *

UNITED STATES PATENT AND TRADEMARK OFFICE
CERTIFICATE OF CORRECTION

PATENT NO. : 7,135,058 B1
APPLICATION NO. : 11/200365
DATED : November 14, 2006
INVENTOR(S) : Kemal Burkay It is certified that error appears in the above-identified patent and that said Letters Patent is hereby corrected as shown below:

Column 1, line 29, delete "(CO)" and insert --(CO, CO2, COx, etc.)--.

Signed and Sealed this

Twelfth Day of August, 2008

JON W. DUDAS
*Director of the United States Patent and Trademark Office*